United States Patent
Swann (10) Patent No.: US 9,567,101 B2
(45) Date of Patent: Feb. 14, 2017

(54) ENGINE FUEL DELIVERY SYSTEM

(71) Applicant: ROLLS-ROYCE PLC, London (GB)

(72) Inventor: Peter Swann, Nottingham (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 14/526,789

(22) Filed: Oct. 29, 2014

(65) Prior Publication Data

US 2015/0134151 A1 May 14, 2015

(30) Foreign Application Priority Data

Nov. 13, 2013 (GB) .................................... 1319997.1

(51) Int. Cl.
| | | |
|---|---|---|
| B64D 45/00 | (2006.01) | |
| B64D 37/00 | (2006.01) | |
| F02C 7/236 | (2006.01) | |
| F02C 3/20 | (2006.01) | |
| F02C 9/40 | (2006.01) | |
| B64D 37/30 | (2006.01) | |

(52) U.S. Cl.
CPC .............. B64D 45/00 (2013.01); B64D 37/30 (2013.01); F02C 3/20 (2013.01); F02C 7/236 (2013.01); F02C 9/40 (2013.01); *F05D 2270/07* (2013.01); *F05D 2270/081* (2013.01); *Y02T 50/671* (2013.01); *Y02T 50/677* (2013.01); *Y02T 50/678* (2013.01)

(58) Field of Classification Search
CPC ............ B64D 37/30; B64D 45/00; F02C 3/20; F02C 7/236; F02C 9/40; F05D 2270/07; F05D 2270/081
See application file for complete search history.

(56) References Cited

U.S. PATENT DOCUMENTS

| | | | |
|---|---|---|---|
| 8,311,686 B2 | 11/2012 | Herkes et al. | |
| 2009/0031731 A1* | 2/2009 | Ziminsky | F02C 3/20 60/777 |

(Continued)

FOREIGN PATENT DOCUMENTS

| | | |
|---|---|---|
| EP | 2204561 A2 | 7/2010 |
| EP | 2 390 481 A2 | 11/2011 |

(Continued)

OTHER PUBLICATIONS

Janna Berry, A greener airport: Sky Harbor tackles auto pollution, Sep. 16, 2009.*

(Continued)

*Primary Examiner* — Abby Lin
(74) *Attorney, Agent, or Firm* — Oliff PLC (57) ABSTRACT

This invention concerns a fuel delivery system for an aircraft engine, including a fuel delivery regulator arranged to receive fuel from a plurality of fuel sources for supply to the engine. An engine operating condition sensor reading is received by a control unit arranged to control operation of the regulator. The control unit actuates the regulator based on a received signal from the engine operating condition sensor in order to vary the volume of fuels from the plurality of fuel sources supplied to the engine during at least a portion of the landing/take-off (LTO) cycle relative to a further portion of the aircraft flight. The different fuels may include kerosene and an alternative fuel, such as a biofuel.

20 Claims, 7 Drawing Sheets

(56) References Cited

U.S. PATENT DOCUMENTS

2011/0101166 A1 5/2011 Schwarze et al.
2013/0110326 A1* 5/2013 Kelm .................. G01N 1/2202
  701/3
2013/0340324 A1 12/2013 Swann

FOREIGN PATENT DOCUMENTS

| EP | 2587151 A2 | 5/2013 | | |
| EP | 2 677 138 A2 | 12/2013 | | |
| GB | 2058211 A | * 4/1981 | ............ | B01F 5/0643 |
| WO | 2009040112 A2 | 4/2009 | | |
| WO | 2012/045028 A1 | 4/2012 | | |
| WO | 2012/045029 A1 | 4/2012 | | |

OTHER PUBLICATIONS

Jan. 27, 2015 Search Report issued in European Application No. 14 19 0784.
U.S. Appl. No. 14/486,563, filed Sep. 15, 2014 in the name of Swann.
U.S. Appl. No. 14/486,337, filed Sep. 15, 2014 in the name of Swann.
Jun. 5, 2014 Search Report issued in Application No. GB1319997.1.

* cited by examiner

ENGINE FUEL DELIVERY SYSTEM

BACKGROUND OF THE INVENTION

The present invention relates to fuel delivery systems for engines and, more particularly, for aircraft engines.

An important focus of improvements to aircraft engine operation concerns the reduction of greenhouse gas emissions due to fuel consumption. Whilst this is a concern for the whole life-cycle of aircraft engines, there is also a more specific consideration of local air quality (LAQ) in the vicinity of airports.

U.S. Pat. No. 8,311,686B discloses a method for assessing engine emissions and/or noise at a collection of ground-based monitoring stations, and presenting the results of that assessment to pilots such that they may determine and implement appropriate actions to minimise the emissions/noise at each of the ground stations. The assessment makes use of information such as aircraft location/altitude relative to each ground station, wind-speed/direction, and engine operation parameters influencing the quantity of emissions actually produced.

However U.S. Pat. No. 8,311,686B does not provide any executive action or decisions for ways to actually reduce emissions but rather requires human interpretation of the output information in order to decide what action may be most appropriate.

It is known in a general sense that the use of alternative aviation fuels can enable reduced levels of emissions from engines. Currently, alternative fuels (particularly biofuels) suffer a very significant price disadvantage in comparison with standard kerosene, and are in short supply. There are also technical limitations which prevent in many cases the complete substitution of kerosene with an alternative aircraft fuel and so, if such alternative fuels are used at all, they are typically supplied to aircraft in a predetermined blend comprising a high percentage of kerosene (representing the majority component within the blended fuel) and an alternative fuel (representing the minority component within the blended fuel).

The relative proportions of alternative fuel and kerosene within the blended fuel composition are determined by such factors as the availability and price of alternative fuel at the aircraft's departure airport, and the attitude of the aircraft operator to the use of alternative fuels which may cost significantly more per liter than standard kerosene. Regulatory limits or technical constraints may also place an upper bound on the proportion of alternative fuel that may be incorporated within the fuel blend.

It is an aim of the present invention to provide an engine fuel delivery system that can provide for a reduction in one or more environmental impact concerns.

BRIEF SUMMARY OF THE INVENTION

According to a first aspect of the invention there is provided a fuel delivery system for an aircraft engine, the system comprising a fuel delivery regulator arranged to receive fuel from a plurality of fuel sources for supply to the engine, an engine operating condition sensor, and a control unit arranged to control operation of the regulator, wherein the control unit actuates the regulator based on a received signal from the engine operating condition sensor in order to vary the volume of fuels from the plurality of fuel sources supplied to the engine during at least a portion of the landing/take-off cycle relative to a further portion of the aircraft flight, wherein the volume of fuels from the plurality of fuel sources is selected for supply to the engine at least in part based upon the particulate matter emissions created by the combustion of said fuel and/or the impact of fuel combustion on local air quality in the vicinity of the aircraft.

The controller typically comprises machine readable instructions, such as one or more module of code and/or control algorithm, for control of the regulator with the aim of reducing engine exhaust emissions which negatively impact local air quality during the landing/take-off (LTO) cycle. The invention may have the benefit/aim of reducing particulate matter emissions from the engine during the LTO cycle, relative to one or more further portions of the flight.

The engine is typically a propulsion engine such as a gas turbine engine, e.g. an axial flow engine.

Each fuel source may comprise a different fuel composition. The plurality of fuel compositions may each comprise a different aromatic content and/or a different sulphur content.

Varying the volume of fuels supplied to the engine from the plurality of fuel sources may comprise varying the flow rate from the one or more sources. Varying the volume of fuels supplied to the engine from the plurality of fuel sources may comprise varying the ratio of fuels from the fuel sources. The ratio of fuels may comprise entirely one fuel, for example by way of switching fuel sources, or else a mixture of the fuels from the plurality of fuel sources. Thus varying the volume of fuels supplied may comprise switching between said fuel sources.

The fuel delivery system may comprise the fuel sources. The plurality of fuel sources may or may not comprise two fuel sources. The plurality of fuel sources may be provided on the aircraft.

Each of the plurality of fuel sources may comprise a fuel tank. Each of the plurality of fuel sources may comprise a network of fluidly interconnected tanks. The plurality of fuel sources may be in fluid communication with the regulator.

The fuel contained in at least one of the plurality of fuel sources may comprise kerosene. Each of the plurality of fuel sources may comprise a distinct composition of fuel. The fuel system may output a mixture comprising a proportion of each distinct fuel composition. Each distinct composition of fuel may have a different aromatic or kerosene content.

This provides the advantage to temporarily reduce the kerosene content of fuel burned by the engine(s) at times when it is particularly desirable to reduce soot or other particulate emissions to reduce engine impact on local air quality in the vicinity of airports.

The regulator may comprise a fuel blender or mixer. The mixer may output a substantially homogeneous fuel mixture comprising the fuels from the plurality of fuel sources. The regulator may comprise an outlet. The regulator may comprise an outlet valve. The flow of fuel into the fuel blender or mixer may be controlled by a plurality of regulator valves.

The regulator may comprise a plurality of individual regulators. The regulator may comprise an individual regulator for each of the plurality of fuel sources. The regulator may comprise a plurality of regulators for each of the plurality of fuel sources. The regulator may comprise a regulator valve. The regulator may comprise a plurality of regulator valves. The regulator may comprise a regulator valve for each of the plurality of fuel sources.

The fuel delivery system may comprise a fuel injector. The fuel injector may be arranged to receive the fuel output from the regulator. The fuel delivery system may comprise a plurality of fuel injectors, for example, for one engine, wherein each fuel injector may be in fluid communication with a different regulator or regulator valve, e.g. for delivery of different fuel compositions to the engine. Mixing of the fuel compositions may take place within a pre-mixing chamber or within the engine combustor.

The control unit may comprise one or more computer processor. The control unit may comprise or be in communication with an engine control unit. The control unit may actuate a plurality of regulators. The control unit may be configured to receive a signal representing the total fuel flow required for the engine. The control unit may be configured to receive one or more signal from the cockpit of the aircraft. The control unit may be configured to receive data concerning the composition of each of the distinct compositions of fuel.

The engine operating condition sensor may be arranged to determine an engine throttle or thrust setting. The engine operating condition sensor may additionally or alternatively comprise an altitude sensor or one or more location sensor. The engine operating condition sensor may comprise an aircraft weight-on-wheels sensor. In one example the controller may reduce the kerosene content within the fuel composition delivered to the engine with reduced engine throttle (and vice versa). The controller may reduce the kerosene content of the fuel composition delivered to the engine in the event that the engine thrust setting falls below a predetermined threshold, which may be indicative of an engine idle condition or an aircraft taxi condition.

The engine operating condition sensor may comprise one or more sensors, which output different sensor readings according to different portions of the LTO cycle.

The controller may comprise a plurality of fuel composition/regulation settings or adjustments according to different predetermined portions of the LTO cycle. The settings may be predetermined settings or predetermined relative adjustments according to current engine operating conditions and/or the volumes of the different fuels on the aircraft.

The system may comprise an ambient condition sensor. The controller may determine an environmental impact factor value based on the ambient condition sensor and may adjust the fuel composition delivered to the engine accordingly.

The system may comprise a controller on the aircraft and/or a ground based controller. Either or both controller may be arranged to receive an indication of the availability of the different fuel compositions. Either or both controller may calculate relative volumes of the different fuel compositions to be loaded onto the aircraft prior to one or more flights. Additionally or alternatively, either or both controller may comprise a predetermined model of one or more aircraft flights, for example comprising a plurality of flight portions or sections, and may predetermine the volume/rate of at least one fuel composition to be supplied to the engine during each portion of the flight in advance. Additionally or alternatively, the model may be updated during the flight in response to sensed conditions or changes in predetermined conditions.

A ground based regulator/controller may communicate a volume of either or both fuel compositions loaded onto an aircraft. Additionally or alternatively, one or more fuel level/volume sensor on the aircraft may output the available volume of each fuel on the aircraft to the controller.

In one embodiment, there may be provided a plurality of regulators, wherein the control unit actuates a single regulator based on a received signal from the ambient atmospheric condition sensor and/or the engine sensor. The actuation of a single regulator based on ambient atmospheric conditions and/or engine state allows the contents of a single fuel source to be supplied to the engine, depending on the needs indicated by the signal from the ambient atmospheric condition sensor and/or the engine sensor.

The regulator may allow a switch from one fuel source to another, for example without allowing for blending of the different fuels over any substantial period of time. A primary fuel source may be used as a default selection. Hence the fuel-burn penalty may be negligible, but the system allows switching to a different fuel composition for predetermined periods of the LTO cycle as necessary.

Figure 7:
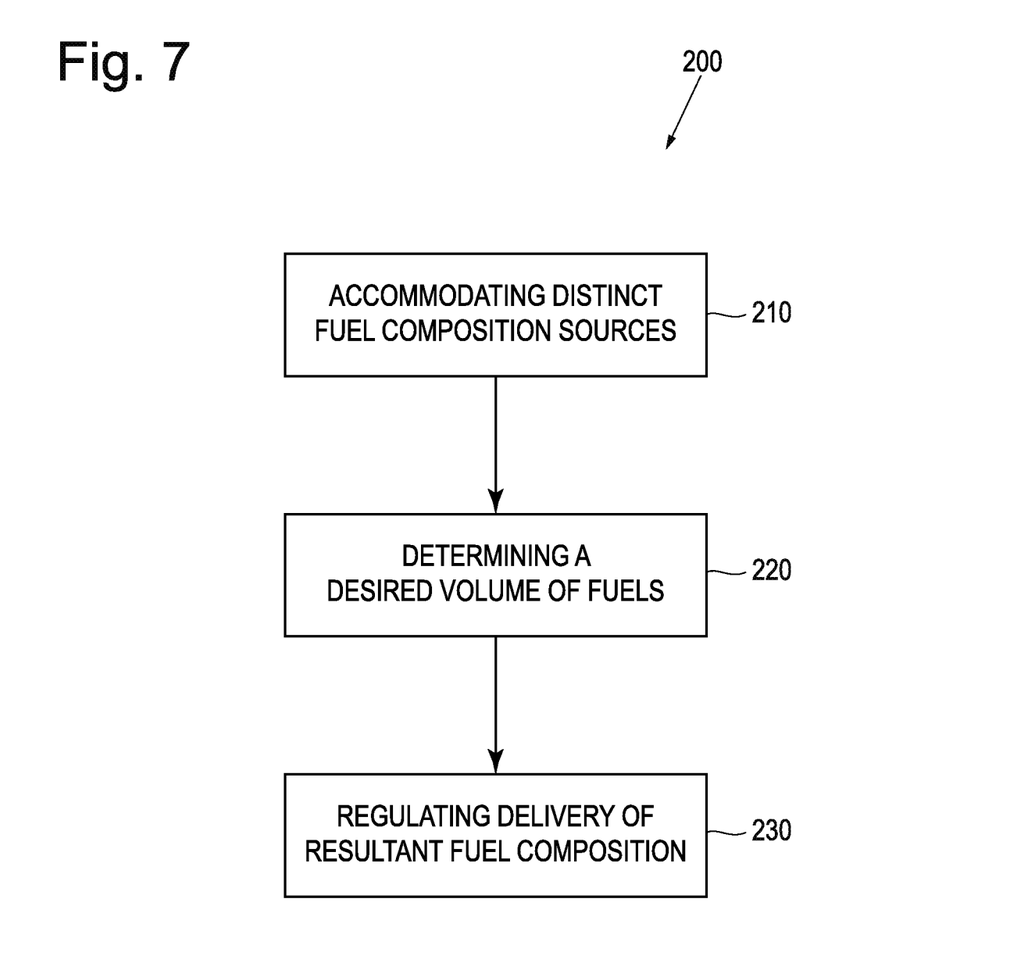
FIG. 7 shows a method of controlling fluid delivery to an aircraft engine according to one example of the invention.

According to a second aspect of the invention, there is provided a method of controlling fuel delivery to an aircraft engine. This method 200 includes, as shown in FIG. 7, a first step 210 of accommodating a plurality of distinct fuel composition sources on an aircraft. The method continues by way of a second step 220 of determining a desired volume of fuels from the plurality of fuel sources to be supplied to the engine during at least a portion of the landing/take-off (LTO) cycle relative to a further portion of the aircraft flight in dependence upon at least one engine operating condition for each of said portions. And it further includes a third step 230 of regulating delivery of a resultant fuel composition from said plurality of fuel composition sources to the engine such that the resultant fuel composition is varied between said portion of the LTO cycle and said further portion of the flight. The volume of fuels from the plurality of fuel sources is selected for supply to the engine at least in part based upon the particulate matter emissions created by the combustion of said fuel and/or the impact of fuel combustion on local air quality in the vicinity of the aircraft.

Wherever practicable, any of the essential or preferable features defined in relation to the system of the first aspect of the invention may be applied to the method of the second aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

Figure 1:
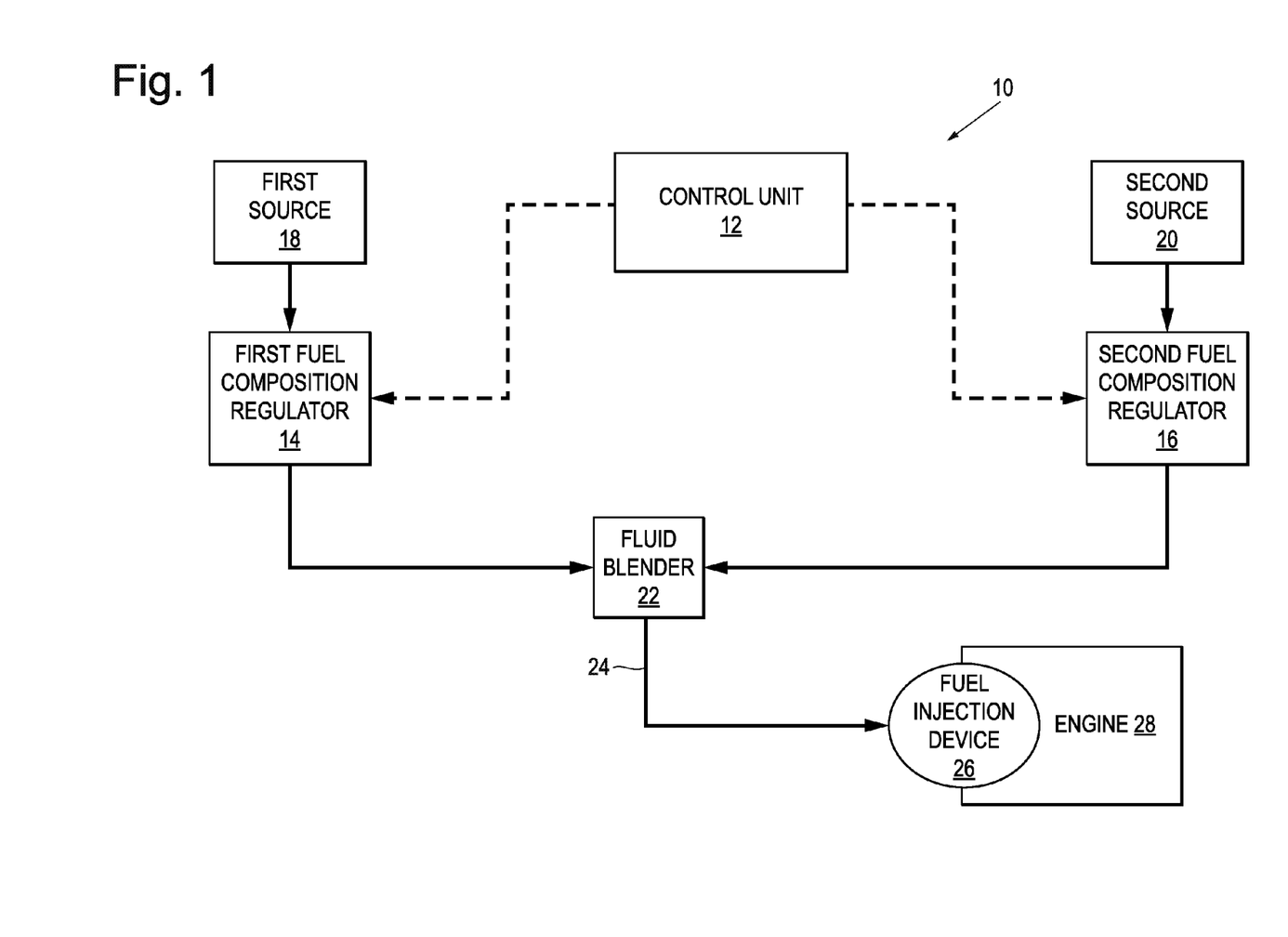
FIG. 1 shows a fuel delivery system according to one example of the invention.

FIG. 1 shows a diagrammatic representation of a fuel system 10 installed onboard an aircraft. The arrows with solid lines indicate the fuel flow communication path, and the arrows with dashed lines indicate signal communication routes.

The fuel system 10 has a control unit 12 which is in signal communication with a first fuel composition regulator 14 and a second fuel composition regulator 16. Each fuel composition regulator 14, 16 is in fluid communication with a source 18, 20 of its respective fuel composition. The source of the first fuel composition is a first tank 18 for storage of a first fuel composition, and the source of the second fuel composition is a second tank 20 for storage of a second fuel composition. The number of fuel composition regulators and/or fuel tanks is dependent upon the number of fuel compositions with which the system is configured to operate and could, for example, include a third or fourth regulator/tank or more as necessary.

The tanks 18, 20 are located on board the aircraft and are fluidly isolated from one another. That is to say, the tanks are not in fluid communication with each other, and there is no flow of fluid between them. The word "tank" is intended to mean an individual tank or a network of fluidly interconnected tanks, where each tank/network is fluidly isolated from the other respective tanks/networks.

The fuel system 10 further comprises a fluid blender 22 in fluid communication with the source 18 of the first fuel composition and the source 20 of the second fuel composition (and others, if present) via the respective regulators 14, 16. The blender 22 is configured to mix the fuel compositions delivered to it from the regulators to produce a resultant fuel composition.

The fluid blender 22 has at least one outlet 24 for delivering the resultant fuel composition to a fuel injection device 26 in the engine(s) 28. The fuel injection device 26 may be any type of fuel injector, for example a fuel nozzle, airspray injector, or plain orifice. The fuel injection device 26 may comprise one fuel injector, or a plurality of fuel injectors. Although in FIG. 1 only one fuel injector 26 is shown, each engine 28 may be fitted with a number of fuel injectors, each in fluid communication with the fuel blender 22.

Figure 2:
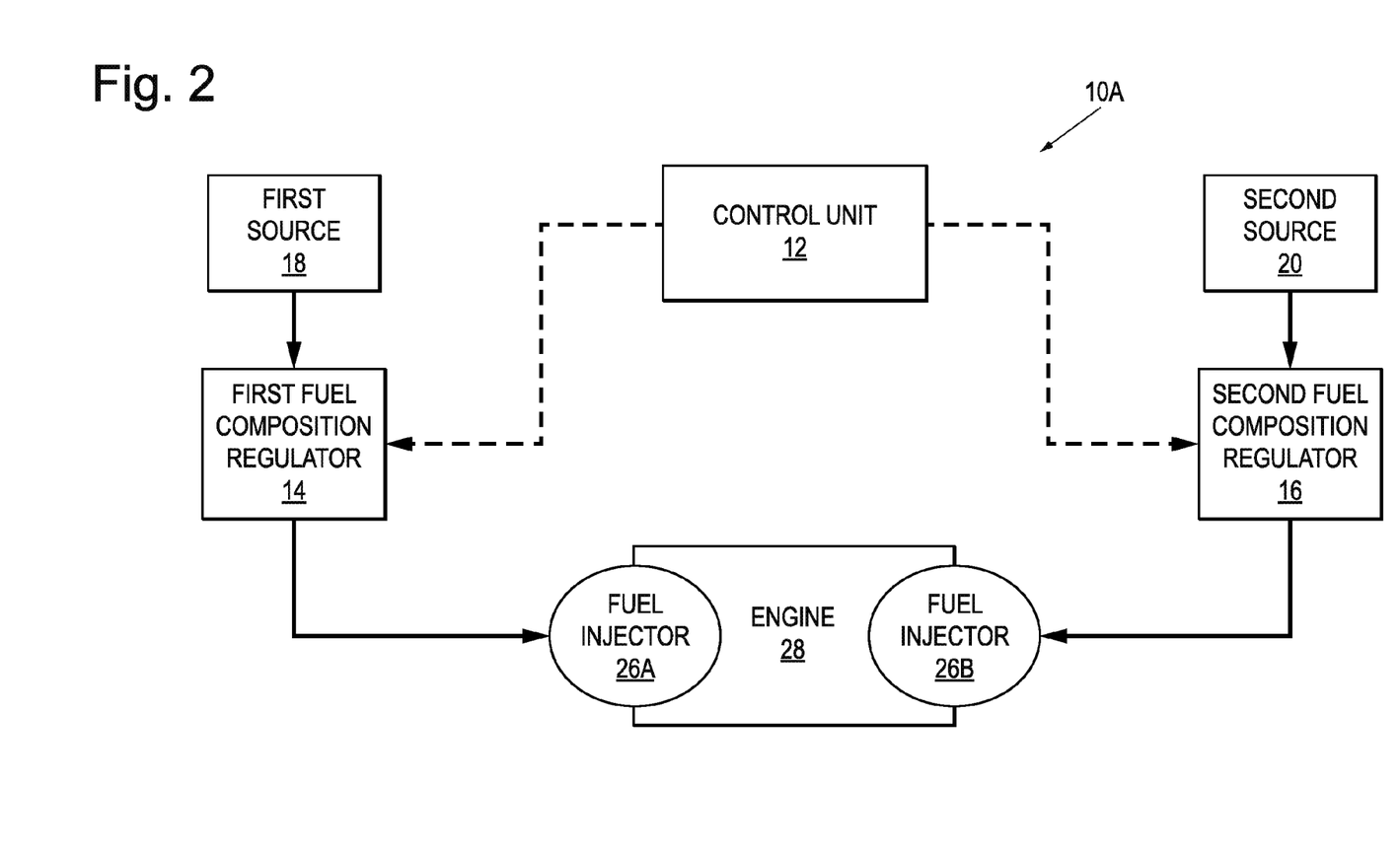
FIG. 2 shows a fuel delivery system according to a second example of the invention.

FIG. 2 shows a diagrammatic representation of an alternative example of the fuel system 10A according to the present disclosure. Features common to the example shown in FIG. 1 share the same reference numerals and will not be described again. The difference between the examples of FIGS. 1 and 2 is that the fuel blender 22 has been removed and the regulators 14 and 16 feed independently to the engine 28 by separate ducts. Thus mixing of the fuel compositions does not occur until fuel streams arrive at the engine 28. In this example, it is proposed that mixing may occur in the engine combustion chamber, e.g. under the turbulent flow conditions therein, which actively promote mixing. Thus, separate fuel injectors 26A and 26B are provided for each fuel composition.

In other examples, the fuel stream may be combined into a common fuel stream/pipe upstream but without a specific fuel blender 22, such that mixing occurs passively in the pipe and/or upon passage through the fuel injector 26 and/or within the combustion chamber. In the event that a premixing chamber is present for mixing the fuel with air, this may beneficially also enhance the mixing of the fuel compositions.

In any such examples, it is possible that the fuel injectors could be of the same or different design/type, e.g. to accommodate different fuel types and/or according to the maximum likely flow rate that each injector is intended to accommodate. In one example an injector for a liquefied gas fuel type may be implemented.

Figure 3:
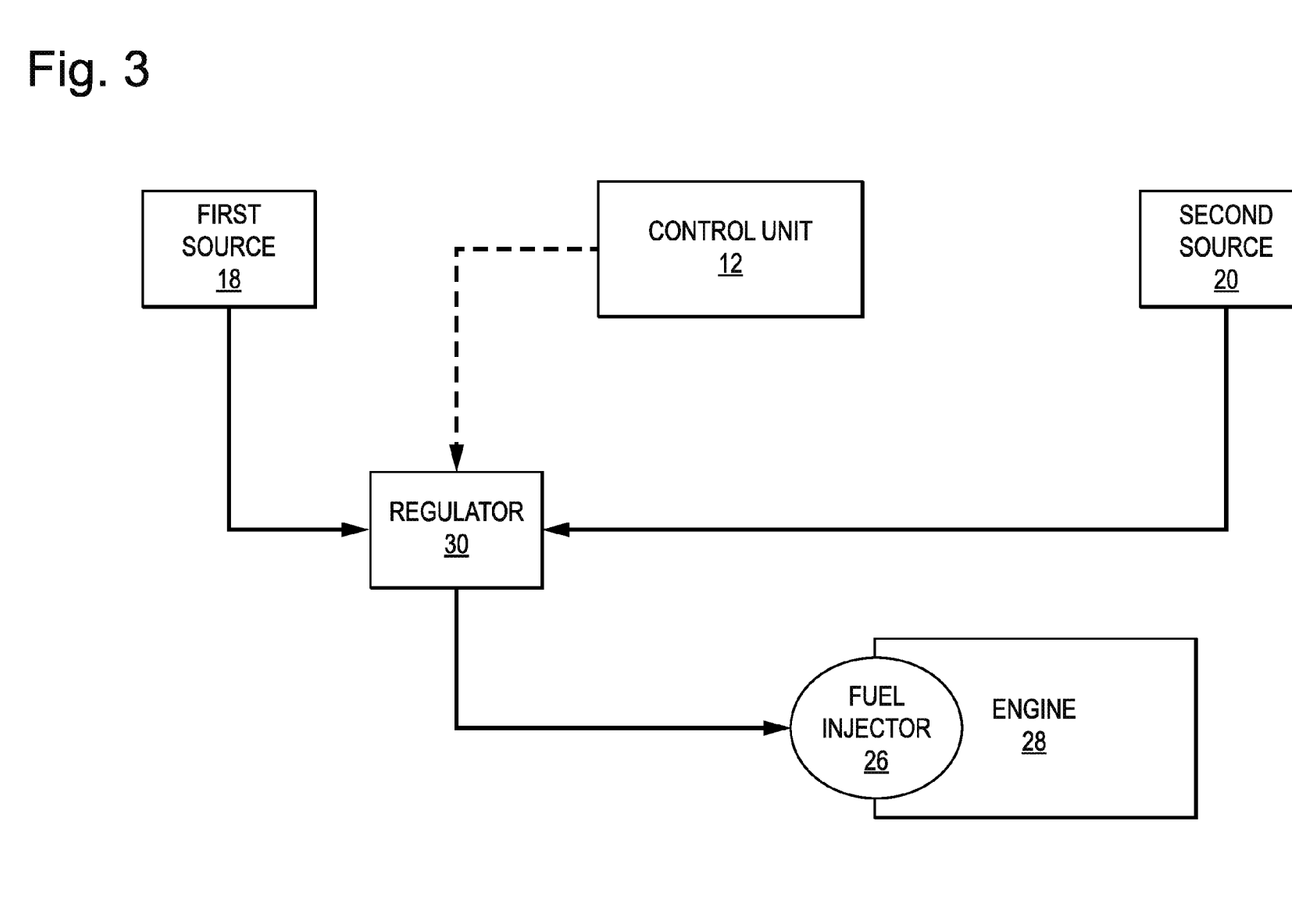
FIG. 3 shows a fuel delivery system according to a third example of the invention.

In FIG. 3, a further possible fuel system configuration is shown, which accommodates an arrangement to switch between different fuel compositions rather than encouraging mixing thereof. Either example of FIGS. 1 and 2 could be operated in a fuel switching, rather than mixing, mode of operation. However, the fuel system has been simplified (thereby allowing possible cost and/or weight savings) in FIG. 3 to accommodate fuel source switching.

In the example of FIG. 3, a single regulator 30 is provided which is in fluid communication with the plurality of fuel sources 18, 20 (e.g. having multiple inlets). The regulator 30 admits input from only one of the fuel sources 18, 20 at any one time for example at a rate corresponding to the entire engine fuel demand according to the engine operating requirements, such as thrust demands. In alternative arrangements, a regulator could be provided for each fuel source but could be operated by the controller 12 such that only one regulator admits fuel for delivery to the engine at any one time.

In any of the above examples, the regulator(s) and/or fuel blender may accommodate metering (i.e. flow rate control) of the fuel composition as well as selection of the final fuel composition make-up. In other examples, separate flow rate control devices may be implemented, i.e. in the flow path between any regulator/blender and the engine, in order to control the flow rate of the final fuel composition to the engine.

For the examples given above, the controller 12 is arranged to control the supply of fuel to the, or each, aircraft engine at a flow rate that is suitable to satisfy the thrust demands, and/or other operating requirements, of the engine 28. However the controller also comprises control instructions for determining a suitable fuel composition from the available fuel composition options within the plurality of tanks 18, 20 according to one or more further operating condition of the engine. The operating condition used for assessment of a suitable fuel composition may comprise one or more of the following: engine throttle setting and/or fuel-flow rate; height of the aircraft above ground level, which may be discretised into bands, for example of 100 feet; and/or position of the aircraft with regard to "sensitive" geographical areas, for example taking account of the prevailing wind direction and/or jet blast direction. The sensitivity of a geographical area provides an indication of the perceived impact of engine PM emissions on local air quality. An area may be perceived to be more sensitive if local PM levels are typically high and/or if local air movement (e.g. according to winds speed) is relatively low. Thus the controller will receive sensor signals from one or more sensor for said operating condition parameters.

The above identified operating condition parameters allow determination of one or more sections of a flight such that the final fuel composition can be varied by the controller according to each section in order to reduce the adverse environmental impact of the engine emissions in an effective manner with minimal or limited consumption of an alternative fuel.

A section of a flight may be identified as a portion of a flight in which one or more operating condition(s) do not change substantially/materially, for example in which the operating condition parameters do not cross one or more threshold or transition point indicative of a further section of the flight.

The different fuel compositions made available in the different fuel sources on the aircraft differ principally in their respective levels of aromatic content and/or sulphur content. One fuel composition, which may be a default fuel composition, may be entirely kerosene or a conventional blend of kerosene with a small percentage of an alternative fuel. The other fuel composition may comprise a significantly higher percentage of an alternative fuel or else may be entirely an alternative fuel. An alternative fuel in the context of the invention may be a biofuel, a gas-to-liquid (GTL) fuel, or liquefied natural gas—or other fuel being relatively low in aromatics and/or other non-paraffinics compared to kerosene. The alternative fuel may be characterised by its production of relatively lower levels of particulate matter when burned in the engine, compared to the default fuel composition such as kerosene.

When identifying the flight sections, for which particulate matter (PM) engine emissions can be reduced to greatest benefit of local air quality (e.g. at airports or in surrounding areas) different sections of the landing/take-off (LTO) cycle have been identified for different fuel composition control. In this regard, 'particulate matter' as referred to herein comprises smoke/soot derived from the carbon content of a fuel and/or other particles (e.g. due to sulphur content) directly emitted within the engine exhaust (i.e. in the combustion products) or created by downstream interactions, including interactions with constituents of the ambient air.

Following is a description of a method of determining the suitable final fuel composition for delivery to the engine(s), which may be performed by the controller 12 either in real-time during a flight or else in advance such that the controller merely instructs the predetermined fuel composition for delivery to the engine upon determining a corresponding section of the flight (by the received operating condition sensor signals). Thus the PM emissions profile across the LTO cycle of an aircraft flight is tailored to minimise PM emission impact on the airport and surrounding communities.

Flight portions or sections may be identified according to characteristic or predicted engine operating conditions occurring during said sections. Within each section a PM impact function (i.e. a local air quality penalty or 'cost' function) can be determined based upon any, any combination, or all of the following: the mass of PM emitted; the number of PM particles emitted; the particle size distribution of the PM emitted; the location-specific and/or time-specific impact of the emitted PM; the additional cost (versus that of 100% kerosene for example, or alternatively versus that of the default fuel composition available at the departure airport), of using the proposed fuel-composition within this section.

A summation of the impact/costs of all the sections falling within the LTO cycle for the flight would then be performed in order to provide a total value. For example the cost function could simply assess the total mass of PM emitted during the LTO phases of a flight and apply a cost per kg of emitted PM to yield the total cost. Additionally or alternatively the cost function could take account of the number of particles emitted and apply a cost per million particles to yield the total cost.

Additionally or alternatively, when performing a summation over the flight's sections, the cost function could apply a weighting to each section reflecting the sensitivity of each geographical location. A sensitivity weighting could be defined to take account of the likely number of people in the vicinity (e.g. schools, residential areas) and whether they are likely to be exposed to PM emissions temporarily in that location or for a prolonged period. Additionally or alternatively a sensitivity weighting could take account of prevailing or measured weather/wind conditions and/or locations where PM concentrations are known to be particularly high. In any example, the weightings could undergo temporal variation, e.g. with air traffic, times of the day (e.g. rush hour), weather changes, seasonal variation or other temporal/cyclic factors known to affect local air quality.

Figure 4:
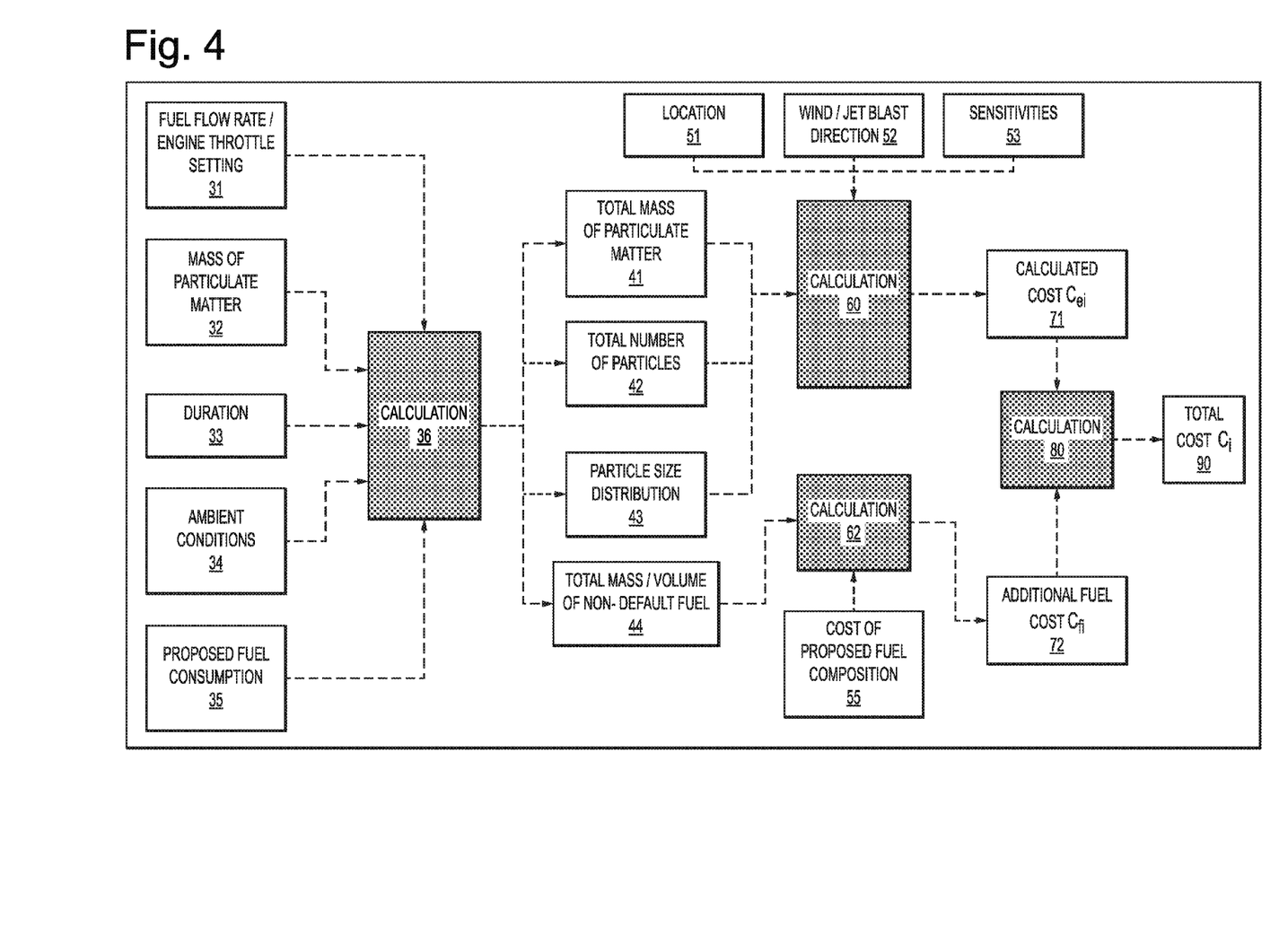
FIG. 4 shows a data flow diagram of a process for determining the suitability of fuel compositions for use in accordance with one implementation of the invention.

An example procedure for calculating the emissions cost/impact value for a proposed fuel composition in a section of a flight is shown in FIG. 4.

Input 31 represents a signal indicative of fuel-flow rate and/or engine throttle setting for each engine 32 represents a model, database or lookup table from which can be calculated or otherwise determined the mass of PM emitted per unit mass of fuel burned ($EI_m$) and/or the number of PM particles emitted per unit mass of fuel burned ($EI_n$) for the fuel-flow rate 31 at the current ambient conditions (e.g. temperature, pressure). The calculation may take account of the further inputs of one or more ambient condition sensor 34 and/or the proposed fuel composition 35. The model, database or look-up table may be engine-specific or engine-type specific.

The $EI_m$ or $EI_n$ for each available fuel composition is an important consideration of the invention and may be referred to herein as the particulate matter emission index value.

Input signal 33 is a time signal or estimation representative of the time-duration of the section.

Stage 36 represents a calculation step or algorithm which uses items 31-35 to determine, for this section: the total mass 41 of particulate matter emitted; the total number 42 of particles emitted; optionally, the particle size distribution 43 of the emitted PM; the total mass and/or volume 44 of non-default fuel required.

Further inputs 51-53 may be used in conjunction with the outputs of stage 36 to determine the impact of the PM emissions on the local area and the corresponding 'cost' value at stage 60. Input 51 is a representation of the location of the section, which may include geographical location (latitude and longitude) and/or altitude. Optional input 52 is a representation of the prevailing wind direction and/or jet blast direction. Optional input 53 is a representation of the position-dependent and time-dependent sensitivities to PM of areas into which emitted PM may travel or be carried by prevailing winds.

The output of calculation 60 is a signal 71 representing the calculated cost $C_{ei}$ of the impact of the PM emissions in this section.

In a practical implementation of the invention, the actual cost in terms of the price of the fuel composition will need to be accommodated in order to generate a useable outcome for the aircraft operator. This is achieved by a further calculation 62 of the additional fuel cost $C_{fi}$ for this section of using the proposed fuel composition rather than the default fuel composition. This calculation has as its inputs signals 44 (described above) and 55, which is a representation of the additional cost of fuel, per liter (or per kilogram), relative to the default fuel composition, of the proposed fuel composition.

Calculation 62 outputs a signal 72 representing the additional fuel cost $C_{fi}$.

80 represents a calculation step which combines the environmental (PM) cost signal 71 and the additional fuel cost signal 72 to yield a total cost $C_i$ for this section. In one example, the combination method could be a simple addition. Output 90 is a signal representing the total cost $C_i$ for this section, which provides a single tradable attribute which can be compared to and/or combined with the corresponding cost output(s) for other flight sections.

Thus, in view of the above example of a calculation routine, knowledge of (proposed) fuel composition, engine operating point, engine combustor characteristics, fuel flow rate, duration of the section etc: the following outputs may be calculated, estimated or otherwise determined (e.g. through use of a lookup-table or database):

Amount of non-default fuel required for this section

Additional cost $C_{fi}$ within this "section" $S_i$ of using the proposed fuel composition rather than the default fuel composition Mass of PM to be emitted in this section Number of particles to be emitted in this section The associated cost of the PM emissions (using mass and/or number of particles) in this flight section can be determined, e.g. using a tariff. Location-specific and/or time-specific weightings are also accommodated by inputs 51-53 to give a total cost $C_{ei}$ for the emissions in this section.

For sections lying outside the LTO cycle then the emissions-related cost $C_{ei}$ would likely be set to zero irrespective of fuel-composition, while the fuel-related additional cost $C_{fi}$ would still be non-zero, except in the case where the proposed fuel-composition for that section is equal to the default fuel composition. In this way the use of expensive fuel outside the LTO cycle would be discouraged.

The above cost calculation is repeated for each section and the total flight cost is simply the sum, over all the sections, of the weighted cost for each section.

Using the above procedure repeatedly for different proposed distributions of fuel-compositions over the LTO cycle will enable an optimised fuel composition solution to be identified in terms of PM cost and fuel cost. In a further development of the concept, the cost function could take account of the particle size distribution in determining the impact of emissions, using knowledge of the dependence upon particle size of the impact upon human health.

Upon determination of the optimal fuel composition for each section of the LTO cycle, the controller 12 of the fuel delivery systems of any one of FIGS. 1-3 could implement the appropriate fuel composition upon detection of the operating conditions indicative of the relevant flight section. One of two alternative modes of operation can be used to determine the optimum distribution of fuel compositions across the various sections of a flight. Either it could be assumed that a fixed amount of alternative fuel is available for the flight and the minimum cost distribution of that fixed amount can be found (e.g. by iterative searching/convergence) between sections of the flight, assuming the necessary quantity of the default fuel composition is available to make up the total fuel requirement for the flight as a whole. Alternatively, the optimal-cost fuel-composition for each section of the flight could be determined, and then combined by summation over the sections of the amount of alternative fuel required for each section, to yield the optimum quantity of alternative fuel required for that flight. The balance of fuel required to achieve the flight is then supplied as the default fuel composition.

The controller 12 could implement the above calculations in advance of a flight in order to prescribe a fuel composition script for the flight and/or during a flight to update the final fuel compositions according to current conditions. However another embodiment, which is in many ways preferred, comprises a ground-based facility, such as a fleet control centre, at which the computationally expensive calculations are performed in advance, such that a resulting fuel composition script is transmitted to the controller 12 on board the aircraft prior to a flight. The controller would thus enact the script by adjusting the final fuel composition delivered to the engine(s) upon detection of the operating conditions indicative of a flight section prescribed by the script, such as any or any combination of engine thrust level, geographical location (e.g. by GPS) and/or altitude. Possible deviations from a prescribed script by a controller are discussed below.

If the scripting calculations are performed by the aircraft controller, the output may be communicated to the ground-based controller.

Whilst the above-described system allows useful determinations of fuel composition for the flight sections, and the required volumes of different fuel compositions to be loaded on an aircraft for a given flight, it must be considered that the relatively expensive alternative fuel composition may need to be optimally distributed across a number of flights and/or aircraft (e.g. across a fleet of aircraft) in order to achieve the most effective PM reductions for the available alternative fuel supplies. The term 'flight' as used herein may thus refer to a single flight or a number of flights between consecutive aircraft refuelling.

In one embodiment, an optimisation algorithm, typically implemented within a ground-based controller, is used to find the best distribution of the available supply of alternative fuel(s) across the planned flights for a number of aircraft in a fleet. In this regard, the emissions cost 71 and fuel composition cost 72 output by the flight optimisation algorithm, either separately or in combination (i.e. total cost 90), could be used to compare the local air quality benefits gained from the use of alternative fuels for different flights and/or LTO flight sections across the fleet of a number of flights per aircraft. Thus the tradable cost attributes become an important factor is coordinating an optimal alternative fuel distribution for loading onto aircraft within the fleet.

Figure 5:
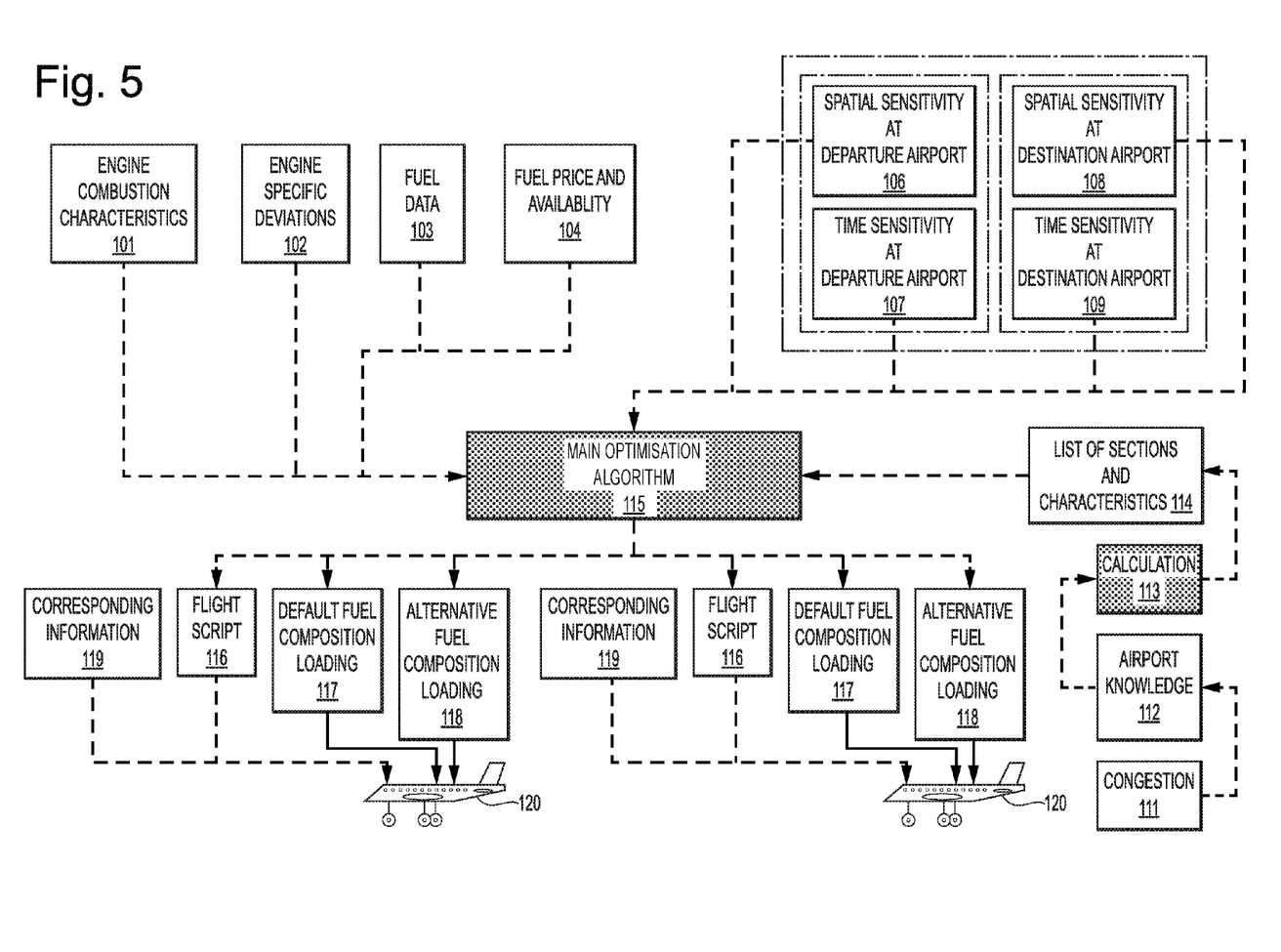
FIG. 5 shows a ground-based system for controlling/managing delivery of fuel to a plurality of aircraft.

FIG. 5 shows a ground-based system, e.g. at the departure airport, which determines how the alternative fuel should best be distributed between a number of different aircraft so manage the total impact of PM emissions across the fleet. Arrows with dashed lines indicate signal communication (e.g. wires or radio signals), while arrows with solid lines indicate fluid communication (e.g. fuel-pipes).

101 represents a stored resource such as a computational model, lookup-table or database detailing engine combustion characteristics for each engine type in the fleet, based on engine specifications and/or embodying the results of measurement campaigns. The stored resource 101 enables the $EI_m$ and $EI_n$ to be determined, as a function of fuel-composition, fuel-flow rate or throttle setting, and engine operating point (ambient temperature, engine internal temperatures etc).

102 represents a further optional input and comprises information on any engine-specific deviations from the type-specific relationship embodied in 101, such deviations having been established from in-service observations using sensors on the planes within the fleet.

103 is a stored resource (e.g. database) of fuel data, e.g. comprising the properties of the distinct fuel compositions available for loading onto aircraft. Alternatively, 103 could comprise fuel composition identification data (e.g. by name or by certification standard) for the fuel compositions actually available for loading, such that their properties can be retrieved from another resource.

104 is a source of data detailing the prices of each of the available fuel compositions, and the available quantity of each.

106-109 represent a single or multiple stored resources (e.g. model, lookup-table or database) or other data sources of factors affecting the sensitivity of the geographical locations or vicinities of airports to PM emissions. In this example inputs 106 and 108 comprise data on the the spatial dependence of sensitivity to PM emissions at a departure airport and destination airport respectively. Optional inputs 107 and 109 comprise any time dependent sensitivity to PM emissions at the departure airport and destination airport respectively.

113 represents a determination of the relevant sections of planned flights, i.e. sub-dividing proposed flights into sections, such as specific LTO sections, which may, by way of example, be carried out as follows:

- Define as the scope of this procedure the period of use between the next refuelling and the subsequent refuelling
- Identify all transition-points at which the aircraft/engine operating point changes substantially/materially
- Divide the flight up into sections, each of which lies between two temporally-adjacent transition-points identified in the previous step
- Optionally, for simplicity, any contiguous period within a single flight during which the altitude above ground level is more than 3000 ft (or some other pre-determined value) could be considered as being a single section.

The calculation 113 will typically take account of the intended flight-plan of the aircraft between its next refuelling and the subsequent refuelling, as embodied by data input 112. Data input 112 may include knowledge of the layout of each airport and the likely ground taxiing route and duration, and/or the expected engine throttle settings to be employed at each section of the flight.

The output of 113 is thus 114, a list of sections and their respective characteristics, such as values or ranges of the following: engine throttle setting and/or fuel flow rate; duration; aircraft location (position and altitude); and/or time of day.

An optional input into determination 113 (e.g. via input 112) comprises input 111, a data resource comprising details of likely congestion to be encountered at particular times of day, which may impact the duration of flight sections.

115 represents the main optimisation algorithm (or other means of calculation) which distributes the available amount of alternative fuel between the various flights and between the sections of each flight and/or which may adjust the intended volume of alternative fuel to be used. To achieve this, the algorithm may use the calculation method described above in relation to FIG. 4 as described above. That function is invoked for each section of each flight to calculate the total cost associated with a proposed distribution of fuel between all sections of all the planned flights for the fleet. To simplify the search through possible distributions of alternative fuel, the initial distribution may be constructed taking account of any or any combination of: the sizes of the aircraft and their likely take-off weights; the lengths of their respective flights; and/or an estimate of the proportion of total fuel burn that will take place within phases of the LTO cycle. For each flight lying within scope of the optimisation, the main optimisation algorithm calculates the cost-optimal distribution of alternative fuel across the various sections of the flight, constrained by the amount of alternative fuel available for that flight.

The optimisation process 115 may optionally be implemented as two nested optimisation loops, the outer loop proposing distributions of alternative fuel between flights, and the inner loop performing a complete optimisation within a flight of the distribution of alternative fuel between sections of that flight. This may help to speed up the overall search process.

The optimisation process 115 outputs for each aircraft, a script 116 specific to each aircraft's next flight, which is communicated to each aircraft and which specifies the transition points between each section and the fuel composition to be used within each section of the aircraft's next flight. The optimisation process also outputs fuel-loading instructions in the form of volumes of both the default fuel composition 117, and the one or more alternative fuel compositions 118 for each aircraft. The aircraft 120 is also supplied with corresponding information 119 which will enable its controller 12 to re-calculate if necessary during the flight the optimal distribution of alternative fuel between remaining sections, as discussed in the following section.

Each aircraft 120 is then loaded with the amount of fuel specified for each fuel type in the loading instructions 117 and 118.

In summary, as described above, the summation of fuel environmental impact costs and fuel composition costs is performed over all the flights to find the total cost of the proposed distribution across flights. The optimisation algorithm explores, e.g. iteratively, alternative distributions, favouring flight sections where it is determined that relatively more favourable ratios of fuel cost to PM emission reduction exist, and assesses the total cost associated with each explored distribution.

The iterative searching process is repeated until a pre-determined criterion is met, such as: a desired total cost threshold has been reached; or a predetermined number of proposed distributions has been explored; or the lowest-cost distribution discovered so far has not been improved for a pre-determined number of iterations; or the rate of improvement (averaged over previous iterations) in the best distribution discovered so far has fallen below some pre-determined threshold. Other termination criterion as would be known to the skilled person familiar with the subject of function optimisation may be employed.

The best distribution between flights that was discovered within the iterative process is then selected and implemented.

During implementation, i.e. as fuelling is carried out or during flights, i.e. as a result of changes to flight sections or assumptions which deviate from the calculated script, it may be necessary to recalculate those parts of the script that relate to any sections of the flight that have not yet been completed. For instance if, during the course of a flight of several hours duration, the weather conditions and/or air traffic congestion at the destination airport change materially, then certain inputs/conditions resulting in the initially deployed script may warrant an updated approach. It will therefore be necessary to re-calculate the fuel composition distribution for the remaining sections of a flight in order to determine an updated optimal use of the remaining fuel on-board. In other words, the script for the remainder of the flight will need to be recalculated.

In one example, limited or no recalculation could be undertaken, such that, once an upper threshold volume of alternative fuel for each section has been consumed, the controller may simply supply the default composition until the next section is reached. In another example, the controller may instigate a simplified or constrained recalculation of the script, in which the total available volume of alternative fuel for that flight is fixed or capped, such that the remaining alternative fuel may be assigned most effectively (e.g. for weighted PM emission reduction) within the expected duration of the remaining sections. In another, more complex re-calculation, the controller (whether aircraft or ground based) may consider the impact on planned future flights and may recalculate the fuel distribution across those flights.

In more sophisticated embodiments, and potentially dependent on the severity of any changes to initial scripts, the recalculated fuel composition distribution for an aircraft may be fed back into the fleet calculations. The fuel distribution planning for the fleet may be updated accordingly to redistribute fuel compositions supplied across the fleet most effectively by re-running the calculation processes described above. A communication channel between each aircraft and the central ground-based controller would thus be beneficial for communication of any script changes either in flight or at the end of each flight. If an in-flight communication channel is used, any recalculation could be carried out at the ground-based facility and transmitted to the aircraft which would update or replace its existing script using the received information. This may ensure that the fleet fuel distribution remains optimal in real-time.

Also, it might be necessary for a small contingency of alternative fuel to be delivered to each aircraft to accommodate deviations from the expected flight plan or script. Furthermore, it is possible that script changes could result in a surplus of alternative fuel being retained by the aircraft at the time of next refuelling, which may be fed back into the fleet model.

Figure 6:
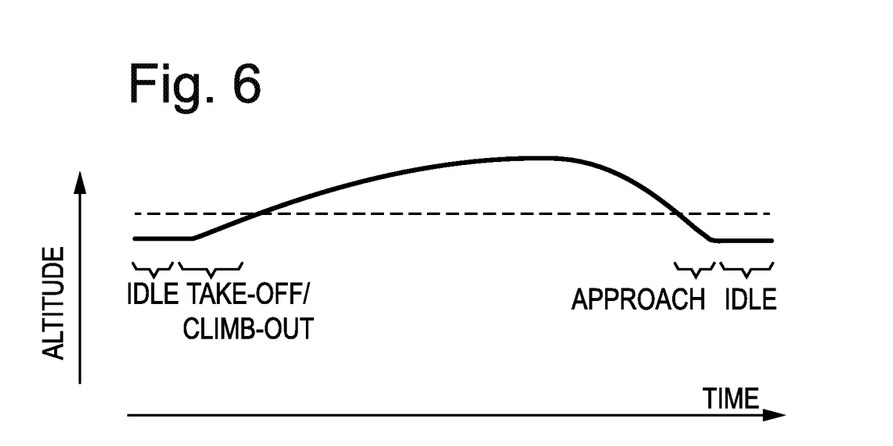
FIG. 6 shows an example of different phases of an aircraft flight.

Turning now to FIG. 6, it is to be understood that a standard landing and take-off (LTO) cycle can be defined at altitudes below 3000 ft relative to the altitude of the airport, as consisting of 4 stages:

Approach: 4 minutes at 30% thrust
Idle: 26 minutes at 7% thrust
Take-off: 0.7 minutes at 100% thrust
Climb-out: 2.2 minutes at 85% thrust.

This definition or any part thereof may be used to identify sections of the LTO cycle in accordance with the invention. However the invention may also accommodate further sections, which may be additional sections or sub-sections of those listed above. For example, sections that are identified by thrust setting may be further sub-divided by location/altitude or vice versa. In any example of the invention it will be appreciated that the duration of the relevant sections and/or thrust thresholds and/or altitudes may be varied according to actual parameters experienced and/or in order to focus on the aim of PM reduction to improve local air quality. For instance take-offs are not always performed with 100% power setting, while idle/taxi times (including ground holding) will vary according to the size of the airport, the path that must be taken, and the level of ground congestion at the time of the aircraft movement.

From the above definition it can been determined that the proportion of total LTO fuel consumed at relatively low power settings, namely within the approach and idle stages, may be higher than maybe conventionally expected, for example approximately 60%. In reality, engines tend to idle at slightly lower than 7% thrust (reducing the significance of fuel-burn in the idle stage). Nonetheless, it will be appreciated that fuel-burn at low throttle settings represents a significant proportion of total LTO fuel-burn. Although for many engines the soot emitted at low power settings is small compared with that emitted at high power settings, this is not always the case. For example, it has been found that for at least one gas turbine engine, a smoke number (a proxy for the mass of soot emitted) in the approach phase is greater than in the "take-off" phase and the climb-out phase. Thus there are clearly cases where total mass of soot emitted in low-power conditions is a significant proportion of the total mass of soot emitted over the entire LTO cycle.

Recent measurements have shown that the number of soot particles per kg of fuel burned, inferred from observations at a ground-based measurement station, is significantly greater at low power (idle/taxi) settings than at high power (take-off) settings, for a number of engine types. Consequently a high proportion of the total number of soot particles emitted within the LTO cycle may, for certain engine types, be attributable to low-power settings. Accordingly the ability to improve the percentage of PM emission reductions available through use of alternative fuels in low-throttle sections of a flight, as enabled by the present invention, is particularly beneficial.

As conventionally defined, a landing-and-takeoff (LTO) cycle comprises the stages of approach, taxi-in, taxi-out, take-off and climb-out, all taking place at the same airport. However, in the context of the present invention it is to be understood that these stages may in a single flight be performed in a different order, from a different starting point and/or at different airport locations so as to enable LTO considerations for one or more flight consisting of departure from a first airport and arrival at another airport, as illustrated in FIG. 6, in which the dotted line represents an altitude above which flight is deemed to lie outside the LTO cycle.

In further developments it is proposed that one or more sensor could be provided on each engine or aircraft within the system of the present invention which provides a signal indicative of the levels of particulate matter (PM) being produced by each engine, e.g. in real-time during engine operation. Rather than predicting PM emissions for a given engine based on the engine specification, the actual PM emissions could be determined and the impact of the invention could be determined. The actual PM emissions could be fed back to the calculations performed by the controllers, as described above, to provide a more accurate assessment of the environmental and fuel costs for that engine. Thus alternative fuel resources could be distributed unevenly between engines of the same type, where it can be seen that the relative PM emissions reduction would be different for those engines. In such embodiments, it may be beneficial if a regulator is provided for each fuel type for each engine, and a dedicated blender for each engine.

In another example of a modification to the systems and methods described above, it is possible that the fuel compositions supplied to an aircraft could be queued in a predetermined sequence using fluidly interconnected fuel tanks. Thus a predefined sequence of fuels compositions for delivery to the engine could be loaded in the different fuel tanks and the controller could simply control a regulator to admit fuel from a particular tank for each LTO section.

In an envisaged deployment of the invention, the primary or default fuel would be kerosene and the alternative fuel(s) would be relatively lower in aromatic and/or other non-paraffinic content. The alternative fuel may have an aromatic content of 10%, 8% or 5% or less.

In any example of the invention, a lower threshold of prolonged safe aromatic content may be prescribed. However the controller may allow the aromatic content of the fuel mix delivered to the engine to fall below the lower threshold value either instantaneously or periodically (e.g. within certain LTO sections) in order to achieve a reduced level of exhaust emissions, provided the average aromatic content for each entire flight (or a series of flights) remains above said lower threshold.

In summary, the invention allows for a fuel delivery system in which a fuel delivery controller (either aircraft or ground-based) determines what proportion of the fuel loaded onto each aircraft and/or delivered to each engine in use should be in the form of an alternative fuel composition rather than the default fuel composition. The calculations and relevant control instructions may be determined to optimally use the alternative fuel for PM emission reduction during the LTO cycle, across any of a flight section, one or more flights of a single aircraft and/or a plurality of flights (e.g. spanning a predetermined time window) by a plurality of aircraft.

The invention claimed is:

1. A fuel delivery system for an aircraft engine, the system comprising:
  a fuel delivery regulator arranged to receive fuels from a plurality of fuel sources for supply to the aircraft engine, each of the fuels comprising a different fuel composition;
  an engine operating condition sensor; and
  a control unit arranged to control operation of the fuel delivery regulator, wherein:
  the control unit actuates the fuel delivery regulator based on a received signal from the engine operating condition sensor in order to vary volumes of the fuels from the plurality of fuel sources supplied to the aircraft engine, and
  during at least a portion of a landing-and-takeoff (LTO) cycle of aircraft flight, the volumes of the fuels from the plurality of fuel sources are selected for supply to the aircraft engine to reduce, relative to another portion of the aircraft flight, particulate matter emissions created by combustion of the fuels.

2. A fuel delivery system according to claim 1, wherein the fuel compositions each comprise a different aromatic or other non-paraffinic content.

3. A fuel delivery system according to claim 1, wherein a first fuel of the fuels comprises a default fuel and a second fuel of the fuels comprises a biofuel, a gas-to-liquid fuel, or liquefied natural gas.

4. A fuel delivery system according to claim 1, wherein the regulator comprises a fuel blender arranged to allow mixing of the fuels from the plurality of fuel sources prior to delivery to the aircraft engine.

5. A fuel delivery system according to claim 1, wherein the engine operating condition sensor senses one or more of an engine throttle thrust setting and an aircraft location.

6. A fuel delivery system according to claim 1, wherein a calculation of predicted particulate emissions by the aircraft engine over the duration of the portion of the LTO cycle is carried out based upon a predicted engine thrust setting, the calculation being used to determine the volume of at least one of the fuels to be delivered to the aircraft engine over the portion of the LTO cycle.

7. A fuel delivery system according to claim 1, wherein a plurality of portions of the LTO cycle are defined according to changes in one or more engine operating conditions therebetween such that each portion of the LTO cycle is bounded by at least one threshold engine operating condition value.

8. A fuel delivery system according to claim 7, wherein:
  a summation of predicted particulate emissions by the aircraft engine over each portion of the LTO cycle is performed, and
  a proposed or default distribution of at least one of first and second fuels from the plurality of fuel sources over the LTO cycle is amended in order to reduce the total of the summation.

9. A fuel delivery system according to claim 7, wherein a particulate matter engine emission value is weighted in dependence upon any or any combination of geographical, temporal, and environmental considerations relative to one or more portions of the LTO cycle.

10. A fuel delivery system according to claim 7, wherein a predetermined script of fuel compositions to be supplied to the aircraft engine for each portion of the LTO cycle is generated in advance of the aircraft flight for implementation by the control unit during a subsequent flight.

11. A fuel delivery system according to claim 7, wherein a calculation of required volumes of the fuels for a planned flight is calculated by, or delivered to, a ground-based fuel supply system controller.

12. A fuel delivery system according to claim 11, wherein the ground-based fuel supply system controller determines an optimal distribution of the fuels across a number of at least one of flights and aircraft.

13. A fuel delivery system according to claim 1, wherein a fuel particulate matter emission index value for each fuel composition of the fuels is fed into a calculation of the volume of each of the fuels to be delivered to the aircraft engine.

14. A method of controlling fuel delivery to an aircraft engine, the method comprising:
  accommodating a plurality of distinct fuel composition sources on an aircraft;
  determining desired volumes of fuels, each of which comprises a different fuel composition, from the plurality of fuel composition sources to be supplied to the aircraft engine during at least a portion of a landing-and-takeoff (LTO) cycle of aircraft flight relative to another portion of the aircraft flight in dependence upon at least one engine operating condition for each of the portions; and
  regulating delivery of a resultant fuel composition from the plurality of fuel composition sources to the aircraft engine such that the resultant fuel composition is varied between the portion of the LTO cycle and the another portion of the aircraft flight,
  wherein during at least the portion of the LTO cycle, the volumes of fuels from the plurality of fuel composition sources are selected for supply to the aircraft engine to reduce, relative to the another portion, particulate matter emissions created by combustion of the fuels.

15. A method of controlling fuel delivery to an aircraft engine according to claim 14, wherein delivery is regulated by a regulator that comprises a fuel blender that mixes fuels from the plurality of fuel sources prior to delivery to the aircraft engine.

16. A method of controlling fuel delivery to an aircraft engine according to claim 14, wherein a calculation of predicted particulate emissions by the aircraft engine over the duration of the portion of the LTO cycle is carried out based upon a predicted engine thrust setting, the calculation being used to determine the volume of at least one of the fuels to be delivered to the aircraft engine over the portion of the LTO cycle.

17. A method of controlling fuel delivery to an aircraft engine according to claim 14, further comprising defining a plurality of portions of the LTO cycle according to changes in one or more engine operating conditions therebetween such that each portion of the LTO cycle is bounded by at least one threshold engine operating condition value.

18. A method of controlling fuel delivery to an aircraft engine according to claim 17, wherein:
  a summation of predicted particulate emissions by the aircraft engine over each portion of the LTO cycle is performed, and a proposed or default distribution of at least one of first and second fuels from the plurality of fuel sources over the LTO cycle is amended in order to reduce the total of the summation.

19. A method of controlling fuel delivery to an aircraft engine according to claim 18, wherein a particulate matter engine emission value is weighted in dependence upon any or any combination of geographical, temporal, and environmental considerations relative to one or more portions of the LTO cycle.

20. A method of controlling fuel delivery to an aircraft engine according to claim 14, wherein a fuel particulate matter emission index value is assigned for each fuel composition of the fuels and fed into a calculation of the volume of each of the fuels to be delivered to the aircraft engine.

* * * * *